United States Patent
Grochowski et al.

(12) 
(10) Patent No.: US 6,353,883 B1
(45) Date of Patent: *Mar. 5, 2002

(54) METHOD AND APPARATUS FOR PERFORMING PREDICATE PREDICTION

(75) Inventors: Edward T. Grochowski, San Jose; Hans J. Mulder, San Francisco, both of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,406

(22) Filed: Dec. 31, 1998

Related U.S. Application Data

(63) Continuation-in-part of application No. 09/129,141, filed on Aug. 4, 1998.

(51) Int. Cl.[7] .................................. G06F 9/318
(52) U.S. Cl. ...................... 712/240; 712/226
(58) Field of Search .................. 712/233, 234, 712/235–236, 237–238, 239, 240, 226

(56) References Cited

U.S. PATENT DOCUMENTS

| | | | | |
|---|---|---|---|---|
| 4,578,750 A | | 3/1986 | Amdahl et al. | 364/200 |
| 4,967,351 A | | 10/1990 | Zmyslowski et al. | 364/200 |
| 4,999,800 A | | 3/1991 | Birger | 364/748 |
| 5,471,593 A | | 11/1995 | Branigan | 395/375 |
| 5,857,104 A | * | 1/1999 | Natrajn et al. | 395/705 |
| 5,903,750 A | * | 5/1999 | Yeh et al. | 712/236 |
| 6,009,512 A | * | 12/1999 | Christie | 712/226 |
| 6,021,487 A | | 3/2000 | Maliszewski | 712/221 |
| 6,115,808 A | * | 9/2000 | Arora | 712/219 |

FOREIGN PATENT DOCUMENTS

| | | |
|---|---|---|
| EP | 0 855 645 A2 | 7/1998 |
| WO | WO 97/48042 | 12/1997 |
| WO | WO 98/08160 | 2/1998 |
| WO | WO 99/14667 | 3/1999 |

OTHER PUBLICATIONS

D. Grunwald et al., "Confidence Estimation for Speculation Control", 1998 IEEE, pp. 122–131.

E. Jacobsen et al., "Assigning Confidence Branch Predictions", 1996 IEEE, pp. 142–152.

S. Manne et al., "Pipeline Gating: Speculation Control for Energy Reduction", 1998 IEEE, pp. 132–141.

K. C. Tai et al., "Evaluation of a predicate–based software testing strategy", IBM Systems Journal, vol. 33, No. 3, 1994, pp. 445–457.

S. Mahlke et al., "Effective Compiler Support for Predicated Execution Using the Hyperblock", 1992 IEEE, pp. 45–54.

* cited by examiner

*Primary Examiner*—Richard L. Ellis
*Assistant Examiner*—Gautam R. Patel
(74) *Attorney, Agent, or Firm*—David J. Kaplan

(57) ABSTRACT

In one method, a predicted predicate value for a predicate is determined. A predicated instruction is then conditionally executed depending on the predicted predicate value. For example, in accordance with one embodiment of the present invention, a predicate table stores historical information corresponding to a predicate. A pipeline coupled to the table receives a predicted predicate value calculated from the historical information. The pipeline may use this predicted predicate value to conditionally execute a predicated instruction. The actual predicate value is provided back to the predicate table from the pipeline.

7 Claims, 7 Drawing Sheets

.

.

MOVE 5 → R(a)

COMPARE R(b), R(c) → p2

IF (p2) THEN MOVE 6 → R(a)

ADD R(a) + 5 → R(d)

.

.

METHOD AND APPARATUS FOR PERFORMING PREDICATE PREDICTION

This is a continuation-in-part of application Ser. No. 09/129,141, filed Aug. 4, 1998.

FIELD OF THE INVENTION

The present invention relates to computer systems and more particularly to computer system processors that support predication and perform predicate prediction.

BACKGROUND OF THE INVENTION

A processor manipulates and controls the flow of data in a computer system. Increasing the speed of the processor will tend to increase the computational power of the computer. Processor designers employ many different techniques to increase processor speed to create more powerful computers for consumers. One technique for increasing processor speed is called predication.

Predication is the conditional execution of instructions depending on the value of a variable called a predicate. For example, consider the two instructions:

COMPARE $P=a,b$

IF $(P)$ THEN $c=d+e$

The first instruction, COMPARE P=a,b, determines a value for the predicate P. For example, if a is equal to b, then the value of predicate P is "True", and if a is not equal to b, then the value of predicate P is "False." "True" and "False" are typically represented in a computer system as single bit values "1" and "0", respectively (or "0" and "1", respectively, in a negative logic implementation).

The second instruction, IF (P) THEN c=d+e, includes two parts. The first part, IF (P) THEN, predicates (or conditions) the second part, c=d+e, on the value of predicate P. If P is true ( e.g. a "1"), then the value of c is set equal to the value of d+e. If P is false (e.g. a "0"), then the second part of the instruction is skipped and the processor executes the next sequential instruction in the program code.

Unfortunately, the COMPARE instruction, COMPARE P=a,b, can take a lengthy amount of time to process. Because of this, the execution of subsequent instructions in the program code sequence may be delayed until the COMPARE instruction is resolved.

SUMMARY OF THE INVENTION

A method and apparatus for performing predicate prediction is described. In one method, a predicted predicate value for a predicate is determined. A predicated instruction is then conditionally executed depending on the predicted predicate value.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
FIG. 1 is program code including a predicated instruction.

A method and apparatus for performing predicate prediction is described in which a predicate is predicted when the confidence in the accuracy of the prediction is high, and the predicate is not predicted when confidence is low. The predicate predictor that implements an embodiment of this invention includes a predicate table having two entries per predicate. The first entry is a predicted predicate value for the predicate and the second entry is a confidence value for the predicted predicate value. The predicate predictor further includes output and input circuitry coupled to the predicate table. The output circuitry evaluates the confidence value and determines if a predicate should be predicted. The input circuitry updates the predicted predicate and confidence values based on previous predicted predicate and confidence values and actual predicate values evaluated by the processor.

In one method of the present invention, the predicted predicate and confidence values corresponding to the predicate of a fetched predicated instruction are read from the predicate table. If the confidence value has a predetermined logical relationship to a predetermined value, no prediction is made. Instead, the execution of the instruction is stalled until the actual predicate value is determined. For example, if the confidence value is less than a particular value, it indicates a low confidence level in the predicted predicate value. In response, a pipeline of the processor is stalled until the actual predicate value is determined. If the confidence value is greater than or equal to the predetermined value, indicating a high confidence level in the predicted predicate value, a prediction is made using the predicted predicate value, and execution of the instruction continues normally.

In another method of the present invention, the predicted predicate value corresponding to the predicate of a fetched predicated instruction is determined by reading historical information from the predicate table. The predicated instruction is then conditionally executed by either executing the instruction or treating the instruction like a no-op depending on the value of the predicted predicate.

After the instruction that determines the actual predicate value completes execution, the resulting actual predicate value is compared to the predicted predicate value. If the prediction was correct, the confidence value corresponding to the predicate is modified in the predicate table by increasing (or decreasing in an inverted implementation) the confidence value, if not already saturated, to indicate increased confidence in the predicted predicate value. If the prediction was incorrect, the confidence value is modified in the predicate table, if not already saturated, to indicate decreased confidence in the predicted predicate value. In this manner, the confidence value tracks correct and incorrect predictions for the predicate made by the predicate predictor. For one embodiment of the present invention, the actual predicate value is also used to update the predicted predicate value in the predicate table.

A more detailed description of embodiments of the present invention, including various configurations and implementations, is provided below.

FIG. 1 is program code 100 including four instructions. The first instruction, MOVE 5→R(a), inserts the value 5 into register R(a). The next instruction, COMPARE R(b), R(c) →p2, compares the value in register R(b) with the value in register R(c) and, if the values are equal, stores a value of 1 (True) in a predicate table for predicate p2. Otherwise, if the value in register R(b) is not equal to the value in register R(c), a value of 0 (False) is stored in the predicate table for predicate p2. The next instruction, IF (p2) THEN MOVE 6→R(a), inserts the value 6 into register R(a) if p2 is 1, and otherwise does nothing if p2 is 0. The last instruction, ADD R(a)+5→R(d), inserts the value of 5 plus the value in register R(a) into register R(d).

Instruction IF (p2) THEN MOVE 6→R(a) of FIG. 1 is a predicated instruction, the execution of which is predicated on the value of predicate p2. If p2 is 1 (i.e. the value in register R(b) is equal to the value in register R(c)), then the value in register R(d) is 11. If p2 is 0, then the value in register R(d) is 10. In accordance with one embodiment, the COMPARE instruction takes three clocks to complete and the IF-THEN and ADD instructions take one clock each. Given these conditions, the IF-THEN and ADD instructions following the COMPARE instruction can be executed before the COMPARE instruction completes if the value of predicate p2 can be predicted. Unfortunately, if p2 is incorrectly predicted, the recovery time may take, for example, ten or more clocks. Therefore, it is important that p2 be predicted only if there is a high likelihood that the prediction will be correct. Otherwise, it is best to wait the three clocks until the COMPARE instruction completes and the actual predicate value for p2 is determined before executing the IF-THEN and ADD instructions.

If the four instructions in the program code 100 of FIG. 1 are contained in a loop, the processor may fetch these instructions many times. After the predicated IF-THEN instruction is fetched, its controlling predicate, p2, is looked up in a predicate table where corresponding predicted predicate and confidence values are read. These values are used by a predicate predictor to make good prediction decisions, and, if necessary, to modify the table entries so that better prediction decisions are made the next time the instruction is re-fetched. The predicate predictor operates according to the state diagram of FIG. 2.

Figure 2:
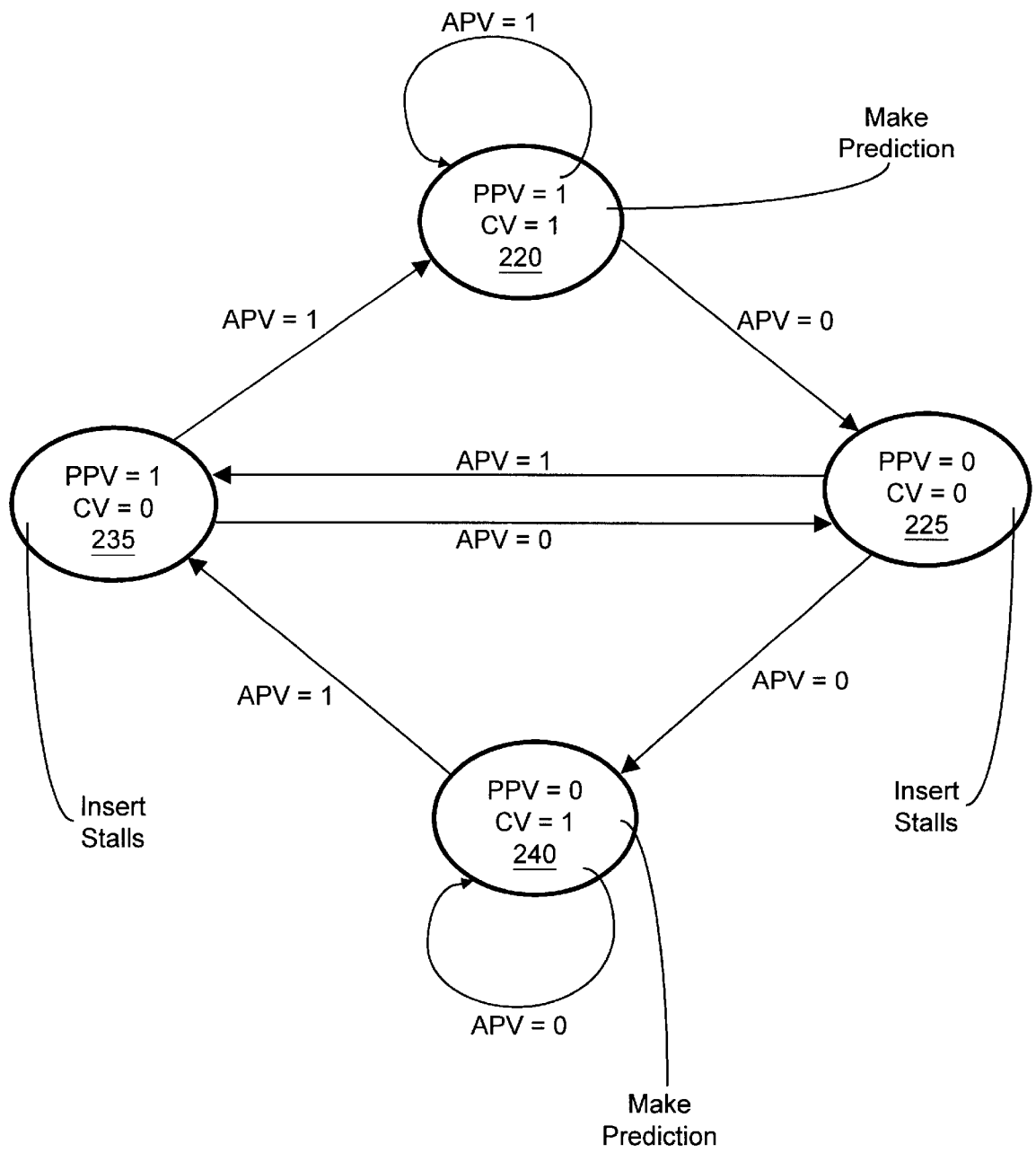
FIG. 2 is a state diagram for predicate prediction in accordance with an embodiment of the present invention.

FIG. 2 is a state diagram for predicate prediction in accordance with an embodiment of the present invention in which four states are defined. In state 220, the predicted predicate value (PPV) in the predicate table corresponding to the desired predicate (p2 in the case of the program code sequence of FIG. 1) is 1. The confidence value (CV) for this PPV, also in the predicate table corresponding to the desired predicate, is 1. For this embodiment of the present invention, a CV of 1 indicates a high confidence in the accuracy of the PPV, so the predicate is predicted to be the PPV of 1. If the actual predicate value (APV) is determined to be 1 after executing the COMPARE instruction that calculates the predicate value, then the prediction is correct, and the high CV of 1 for the PPV of 1 is maintained.

If, however, the APV is determined to be 0, then the prediction is incorrect and the state machine transitions to state 225 of FIG. 2. Note that the incorrect prediction results in a recovery delay including a pipeline flush and re-execution of the instruction predicated on the incorrectly predicted predicate. In addition, any subsequent instructions that relied directly or indirectly on the incorrectly predicted predicate are flushed and re-executed.

In state 225 of FIG. 2 the CV is lowered to 0, indicating less confidence in the PPV, and the PPV is modified by setting its value to the previously calculated APV of 0. The CV and PPV are entered back into the predicate table at the location corresponding to the incorrectly predicted predicate. In accordance with the embodiment of FIG. 2, a CV of 0 tells the processor that the odds that the PPV is accurate are very low. So low, in fact, that it would be better to wait until the APV is determined by, for example, completing execution of a COMPARE instruction rather than using the PPV to predict the predicate and possibly suffer a significant recovery delay. For this reason, the predicate predictor sends a signal to the instruction scheduling and execution units of the processor. In response, pipeline stalls are inserted until the APV is determined. Once the APV is determined, the APV is used to resolve the predication, and instruction execution proceeds normally.

For an alternate embodiment of the present invention, instead of inserting pipeline stalls until the APV is determined, stalls are inserted for a predetermined period of time. This embodiment may be found useful in applications in which it is already known how long (i.e. how many clocks) it takes to determine the APV for most applications. In accordance with this embodiment of the present invention, this predetermined period of time is less than the recovery time for a mispredicted predicate.

If the predicate predictor is in state 225 of FIG. 2 and an APV is determined to be 1, the predicate predictor transitions to state 235. In state 235, the CV remains 0, indicating low confidence in the PPV, and the PPV is modified by setting its value to the previously calculated APV of 1. The CV and PPV are entered back into the predicate table at the location corresponding to the incorrectly predicted predicate. In accordance with the embodiment of FIG. 2, the CV of 0 tells the processor that the odds that the PPV is accurate are very low. Therefore, the predicate predictor sends a signal to the instruction scheduling and execution units of the processor. In response, pipeline stalls are inserted until the APV is determined. Once the APV is determined, the APV is used to resolve the predication, and instruction execution proceeds normally.

Once in state 235, if an APV is determined to be 1, the predicate predictor transitions back to state 220 described above, and the CV is raised to 1 while the PPV remains unchanged. If, on the other hand, the APV is determined to be 0, the predicate predictor transitions back to state 225.

If the predicate predictor is in state 225 of FIG. 2 and an APV is determined to be 0, the predicate predictor transitions to state 240. In state 240, the CV is raised to 1 and the PPV is set to 0. The CV of 1 indicates a high confidence in the PPV. The CV and PPV are entered back into the predicate table at the locations corresponding to the predicate. When the predicate predictor is in state 240, predictions are made for the predicate in a corresponding position in the predicate table using a PPV of 0. If, after predicting a PPV of 0, the APV is determined to be 1, the predicate predictor transitions to state 235, described above, whereupon the CV is lowered to 0 and the PPV is set to the calculated APV of 1. If, however, the APV is determined to be 0, the predicate predictor remains in state 210.

For an alternate embodiment of the present invention, additional stall states or prediction states are inserted into the state machine of the predicate predictor, and the CV may be any number of bits in length. One such embodiment is described below in conjunction with FIG. 4. For another embodiment, the CV and PPV are determined independently of one another. In accordance with an alternate embodiment of the present invention, inverted logic is used in which a lower CV indicates a higher confidence in the PPV, and vice-versa. In addition, an alternate algorithm may be implemented to determine the PPV other than the above-described algorithm in which a subsequent PPV is simply set to it's immediately preceding APV.

Figure 3A:
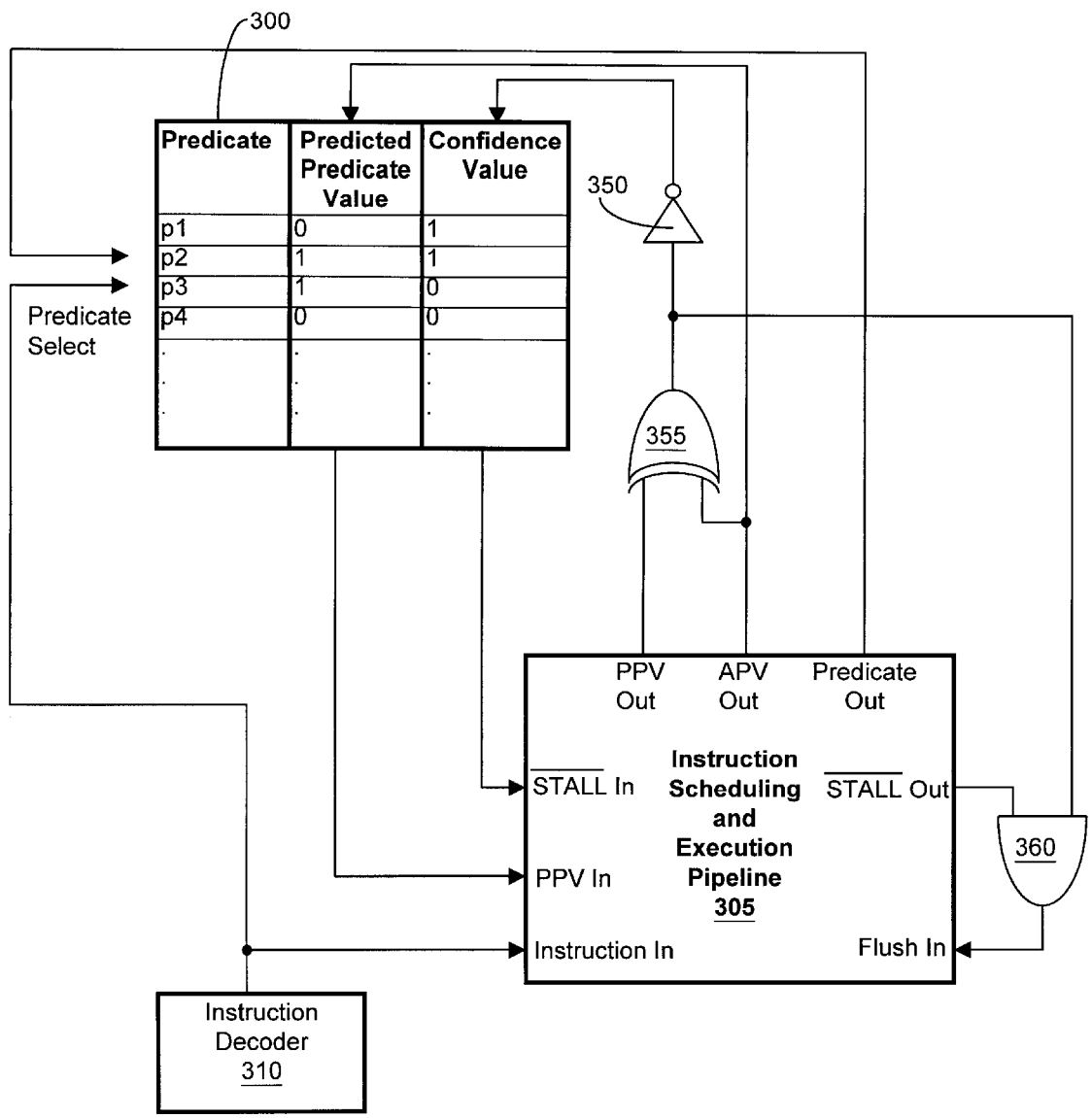
FIG. 3A is a predicate predictor implementing the state diagram of FIG. 2.

FIG. 3A is a predicate predictor implementing the state diagram of FIG. 2. Predicate table 300 includes PPV entries and CV entries, each corresponding to a predicate. The output of the PPV portion of table 300 is coupled to the PPV input of instruction scheduling and execution pipeline 305. The output of the CV portion of table 300 is coupled to the inverted STALL input of pipeline 305. The output of instruction decoder 310 is coupled to the instruction input of pipeline 305 as well as to predicate select circuitry (e.g. a multiplexer) coupled to predicate table 300. The PPV and APV outputs of pipeline 305 are coupled to inputs of XOR gate 355. In addition, the APV output of pipeline 305 is coupled to the input of the PPV portion of predicate table 300. The predicate output of pipeline 305 is coupled to the predicate select circuitry of predicate table 300. The output of XOR gate 355 is coupled to the input of the CV portion of predicate table 300 via inverter 350. The output of XOR gate 355 is also coupled to an input of AND gate 360. The inverted STALL output of pipeline 305 is coupled to the other input of AND gate 360, the output of the AND gate being coupled to the flush signal input to pipeline 305.

To demonstrate the operation of the predicate predictor of FIG. 3A, consider the execution of program code 100 of FIG. 1. After the processor fetches the instruction COMPARE R(b), R(c)→p2, the instruction is decoded in instruction decoder 310 and is executed in instruction scheduling and execution pipeline 305 of FIG. 3A. After the processor fetches the instruction IF (p2) THEN MOVE 6→R(a), the instruction is decoded in instruction decoder 310. Predicate p2 is extracted from the decoded instruction and forwarded from instruction decoder 310 to the predicate select circuitry of predicate table 300. The PPV of 1 and CV of 1 corresponding to p2 are read. This corresponds to state 220 of FIG. 2. The decoded instruction is also forwarded from instruction decoder 310 to the instruction input to pipeline 305.

The PPV of 1 is forwarded to the PPV input of pipeline 305 in FIG. 3A and the CV of 1 is forwarded to the inverted STALL input of pipeline 305. The STALL signal, therefore, is 0, indicating that pipeline 305 is not to be stalled (i.e. a prediction is to be made using PPV). Within pipeline 305, the IF-THEN instruction is evaluated predicting that p2 is true. As a result, the value of 6 is moved into register R(a). The subsequent instruction, ADD R(a)+5→R(d), is decoded by decoder 310 and forwarded to pipeline 305 where it is executed. Hence, 11 (R(a) plus 5), is inserted into register R(d).

After these instructions are executed in pipeline 305 of FIG. 3A, the COMPARE instruction completes, and the APV is determined and forwarded to an input of XOR gate 355 and to the PPV input of predicate table 300. The PPV of 1 for p2 is also forwarded to an input of XOR gate 355. If the APV for p2 is equal to 1 (i.e. the value in register R(b) is equal to the value in register R(c)), then the output of XOR gate 355 is 0. This 0 is inverted to a 1 and is provided to the CV input of predicate table 300. The 1 is entered into the table for the CV entry corresponding to p2. The APV of 1 is also entered into the table for the PPV entry corresponding to p2. The output of XOR gate 355 of 0 is also provided to an input of AND gate 360, ensuring that the output of this gate is also 0, resulting in no flush of pipeline 305.

If, instead, the APV for p2 is equal to 0 ((i.e. the value in register R(b) is not equal to the value in register R(c)), then the output of XOR gate 355 of FIG. 3A is 1. This 1 is inverted to a 0 and is provided to the CV input of predicate table 300. The 0 is entered into the table for the CV entry corresponding to p2. The APV of 0 is also entered into the table for the PPV entry corresponding to p2. The output of XOR gate 355 of 1 is provided to an input of AND gate 360. The inverted stall output from pipeline 305, which is also 1, is provided to the other input of AND gate 360. As a result, the output of the AND gate is 1, and this 1 is provided to the flush input to pipeline 305, causing the pipeline to flush and re-execute the predicated IF-THEN instruction along with any subsequently executed dependent instructions.

The PPV of 0 and CV of 0 entered into predicate table 300 for predicate p2 corresponds to a transition to state 225 of FIG. 2. A subsequent use of predicate p2 would result in stalling the execution of the instruction predicated on p2 until its APV is determined, and a transition to either state 235 if the APV is determined to be 1 or state 240 if the APV is determined to be 0.

For an alternate embodiment of the present invention, the PPV and CV entries corresponding to each predicate in the predicate table are unified such that a PPV and a CV can be determined from a single entry in the table. For another embodiment, each PPV or CV entry includes 2 or more bits to accommodate, for example, more sophisticated predicate prediction techniques or additional confidence states.

Figure 3B:
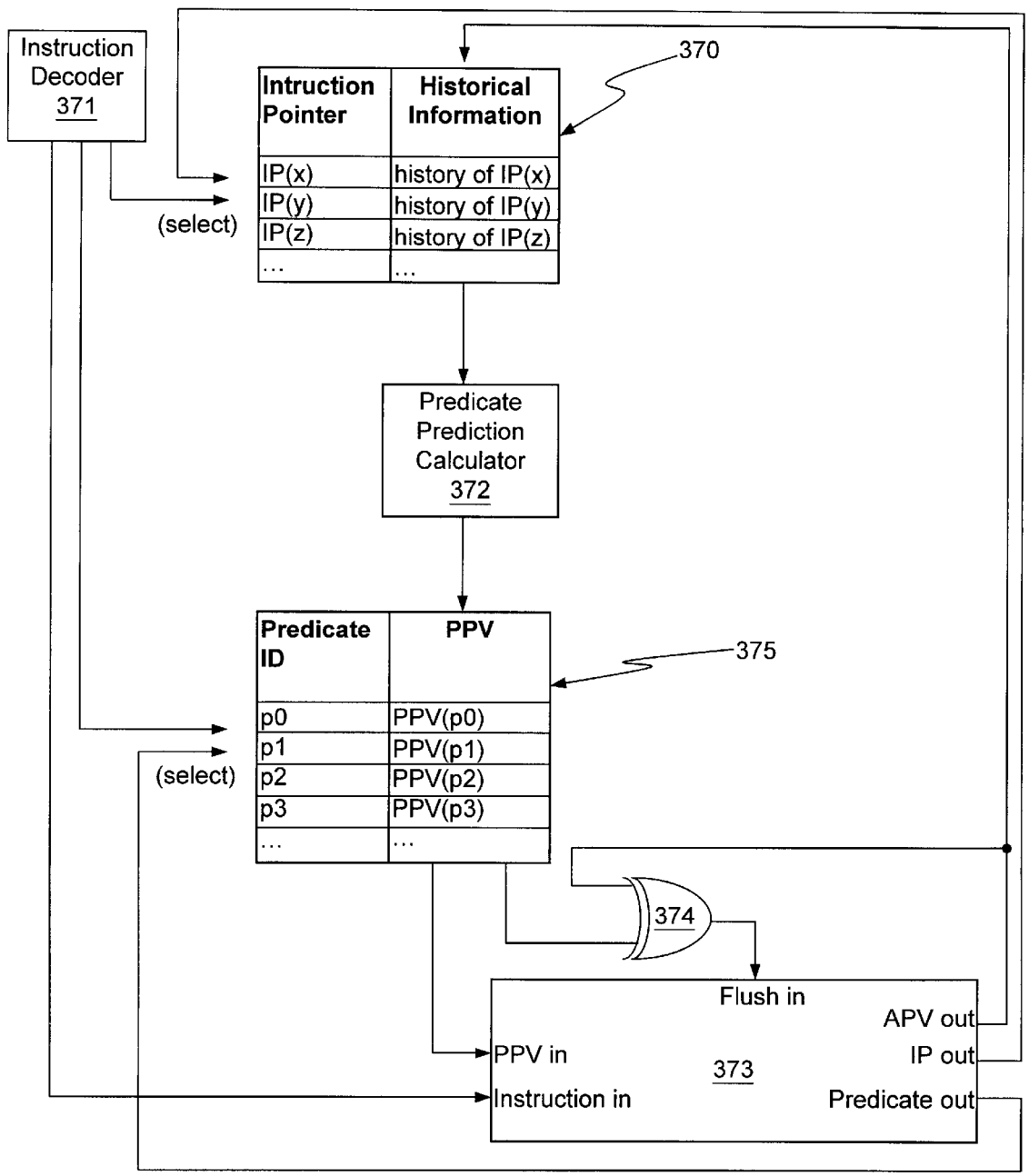
FIG. 3B is a predicate predictor in accordance with an alternate embodiment of the present invention.

FIG. 3B is a predicate predictor formed in accordance with an alternate embodiment of the present invention. Predicate table 370 includes historical information corresponding to the instruction pointer (IP) of the COMPARE instruction that sets the predicate. An output of table 370 is coupled to an input of predicate prediction calculator 372. The output of predicate prediction calculator is coupled to an input of speculative predicate register file (SPRF) 375, one output of which is coupled to the PPV input of instruction scheduling and execution pipeline 373. Another output of SPRF 375 is coupled to an input of XOR gate 374. The output of instruction decoder 371 is coupled to the instruction input of pipeline 373 as well as to the IP select and predicate ID select circuitry (e.g. multiplexers) of predicate table 370 and SPRF 375, respectively. The APV output of pipeline 373 is coupled to an input of XOR gate 374 and to an input of predicate table 370. The output of XOR gate 374 is coupled to the flush signal input of pipeline 373. The IP output of pipeline 373 is coupled to the IP select circuitry of table 370, and the predicate output of pipeline 373 is coupled to the predicate ID select circuitry of SPRF 375.

To demonstrate the operation of the predicate predictor of FIG. 3B, consider the execution of program code 100 of FIG. 1. After the processor fetches the instruction COMPARE R(b), R(c)→p2, the instruction is decoded in instruction decoder 371. The IP address of the COMPARE instruction is used to select the appropriate location from table 370. The historical information associated with the IP address (and, hence, associated with p2), is read from table 370 and provided to predicate prediction calculator 372.

Predicate prediction calculator 372 of FIG. 3B uses this historical information to calculate the PPV for p2. For one embodiment of the present invention, the historical information is simply a single bit that records the previous APV for p2. This embodiment is demonstrated in FIGS. 2 and 3A, as described above. For this embodiment, predicate prediction calculator 372 may simply pass the value read from predicate table 370 through to the input of SPRF 375.

For another embodiment of the present invention, the historical information may include additional bits, and predicate prediction calculator 372 of FIG. 3B may use these bits in conjunction with branch prediction techniques to provide for a more accurate PPV. For example, a two bit up-down counter or bimodal prediction technique may be used to better tolerate a single, inaccurate PPV within a series of accurate PPVs for a particular predicate. Local or global prediction techniques may also be used, or, alternatively, a combination of techniques may be used in, for example, a chooser predictor. The historical information may include information related to program history, context correlation, success rates, etc. For an alternate embodiment of the present invention, some or all of the circuitry and function of predicate prediction calculator 372 is merged into predicate table 370 such that the PPV is stored in the table rather than calculated on the fly by calculator 372.

After the PPV for p2 is determined using the historical information, the PPV and predicate p2 are stored in SPRF 375 of FIG. 3B. In accordance with one embodiment of the present invention, SPRF 375 is a register file that includes PPV storage locations for all predicates. Speculative predicates (PPVs) that have not yet been committed to an architectural state are stored in SPRF 375 at their appropriate location. For one embodiment of the present invention in which the processor architecture provides for 64 predicates, SPRF 375 includes 64 locations, p0–p63, in which PPVs may be stored. In parallel with the PPV calculation and storage steps described above, the COMPARE instruction is provided to the input of pipeline 373 where it is executed to calculate the APV for p2.

Returning to the example in which the sequence of instructions of FIG. 1 are executed, the processor fetches the instruction IF (p2) THEN MOVE 6→R(a), and the instruction is decoded in instruction decoder 371 of FIG. 3B. The predicate ID of p2 is forwarded from instruction decoder 371 to the select circuitry of SPRF 375 where it is used to select the appropriate PPV. The PPV for p2 is read from SPRF 375 and is provided to the PPV input of pipeline 373 while the predicated IF-THEN instruction is provided to the instruction input of pipeline 373.

Within pipeline 373 of FIG. 3B, the predicated IF-THEN instruction is conditionally executed depending on the PPV. If the PPV is true, the instruction is executed normally, moving the value of 6 into register R(a). If the PPV is false, the instruction is treated like a no-op, leaving the value of 5 in register R(a). For an alternate embodiment of the present invention, a PPV of false results in the execution of the instruction, and a PPV of true results in the instruction being treated like a no-op.

During the execution of the predicated IF-THEN instruction in pipeline 373 of FIG. 3B, the COMPARE instruction completes execution. The APV for predicate p2 is determined from the result of the COMPARE instruction, and this APV is forwarded to predicate table 370. The IP of the COMPARE instruction is transferred to the IP select circuit of predicate table 370 and is used to select the appropriate location in the table into which the APV for p2 is written. This APV is used to update the historical information associated with p2. This historical information is re-accessed upon a re-execution of the predicated IF-THEN instruction to calculate a new PPV for p2.

This APV is also forwarded to an input of XOR gate 374 of FIG. 3B. The predicate ID of p2 is provided to the select input of SPRF 375 from the predicate output of pipeline 373. The PPV for predicate p2 is read from SPRF 375 and provided to the other input of XOR gate 374. The output of XOR gate 374, which indicates the result of a comparison between the PPV and the APV, e.g. the accuracy or success of the prediction, is provided to the flush input of pipeline 373.

If the APV for p2 is equal to the PPV for p2, meaning that the PPV was accurate, then the output of XOR gate 374 of FIG. 3B is 0. This 0 is provided to the flush input of pipeline 373, resulting in no flush of pipeline 373 and continued, normal execution of instructions. If, instead, the APV is not equal to PPV, meaning that the PPV was inaccurate, then the output of XOR gate 374 is 1. This 1 is provided to the flush input of pipeline 373, resulting in a flush of pipeline 373 and a replay or re-execution of the sequence of instructions beginning with the predicated IF-THEN instruction using the APV for p2. For one embodiment of the present invention, the pipeline flush is a flush of the backend portion of the pipeline, including the register read and execution stages, while operation continues in the front end of the pipeline, including the instruction fetch and decode stages. This embodiment may be useful for a pipeline in which the front and back ends are separate or decoupled pipelines.

In addition to providing the APV for p2 to predicate table 370 and to an input of XOR gate 374 of FIG. 3B, the APV for p2, along with its predicate ID, is provided to the architectural predicate register file (APRF) (not shown) to update the value of predicate p2. The APRF stores non-speculative, architecturally committed predicate values, and is accessed by subsequent instructions predicated on p2 to determine if the instruction is to be executed or treated like a no-op. Upon providing the PPV for p2 to XOR gate 374, SPRF 375 invalidates the entry associated with p2. In this manner, future access of SPRF 375 by subsequent instructions predicated on p2 will result in a miss, forcing the instructions to use the APV for p2 stored in the APRF.

Figure 4:
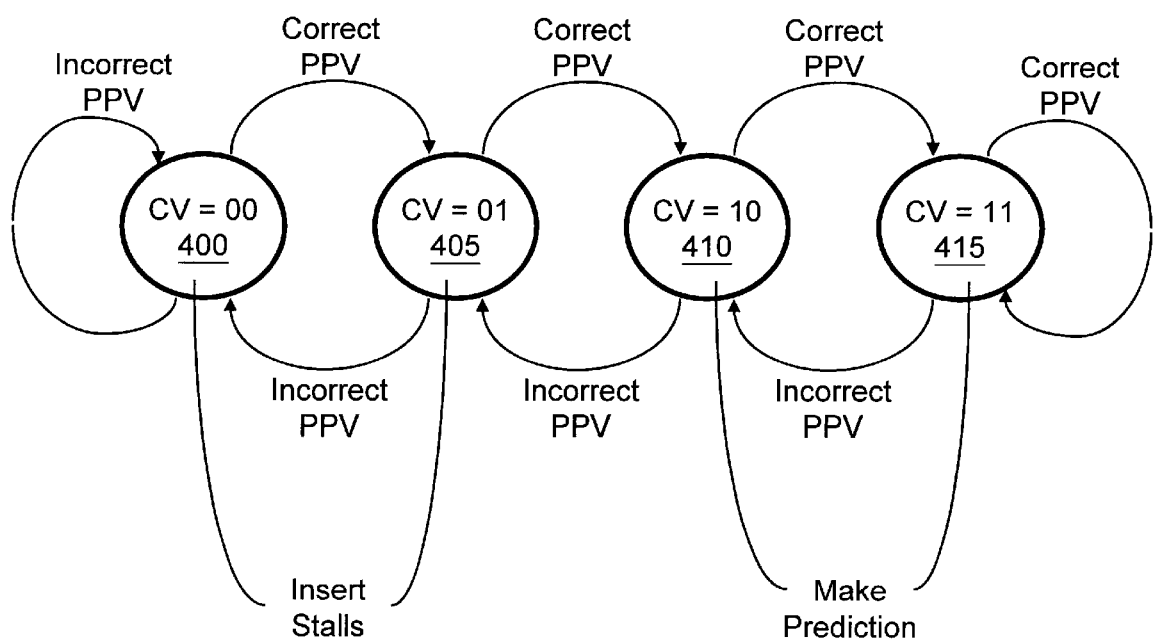
FIG. 4 is a state diagram for predicate prediction in accordance with an alternate embodiment of the present invention.

FIG. 4 is a state diagram for predicate prediction in accordance with an alternate embodiment of the present invention in which additional confidence states are implemented and the PPV calculation is independent of CV calculation. This embodiment may be implemented using a counter to modify the CV wherein the CV is incremented with every correct prediction (the PPV is equal to the APV for a particular predicate) and is decremented with every incorrect prediction (the PPV is not equal to the APV for a particular predicate) with saturation at both ends.

In state 400 of FIG. 4, the CV is 00. For this embodiment, a CV of 00 indicates a very low confidence in the PPV. As a result, stalls are inserted in the processor pipeline until the APV is calculated by execution of, for example, a COMPARE instruction. Once the APV is determined, it is compared to the PPV stored in the predicate prediction table. If the APV is not equal to the PPV, the PPV is deemed to be "incorrect" (even though no actual prediction was made), and the predicate predictor remains in state 400 for the particular predicate. If, however, the APV is equal to the PPV, the PPV is deemed to be "correct", and the predicate predictor transitions to state 405, incrementing the CV to 01.

In state 405 of FIG. 4, the CV is 01. For this embodiment, a CV of 01 indicates a low confidence in the PPV. As a result, stalls are inserted in the processor pipeline until the APV is calculated. After the APV is determined, it is compared to the PPV stored in the predicate table. If the APV is not equal to the PPV, the PPV is incorrect and the predicate predictor transitions back to state 400, decrementing the CV to 00. If, however, the APV is equal to the PPV, the PPV is correct, and the predicate predictor transitions to state 410, incrementing the CV to 10.

In state 410 of FIG. 4, the CV is 10 and, for this embodiment, a CV of 10 indicates a sufficiently high confidence in the PPV. As a result, a prediction is made that the predicate is equal to the PPV. After the APV is determined, it is compared to the PPV. If the APV is not equal to the PPV, the PPV is incorrect and the predicate predictor transitions back to state 405, decrementing the CV to 00. In addition, the processor must recover from the incorrect prediction, as explained above. If, however, the APV is equal to the PPV, the PPV is correct, and the predicate predictor transitions to state 415, incrementing the CV to 11.

In state 415 of FIG. 4, the CV is 11 and, for this embodiment, a CV of 11 indicates a high confidence in the PPV. As a result, a prediction is made that the predicate is equal to the PPV. After the APV is determined, it is compared to the PPV. If the APV is not equal to the PPV, the PPV is incorrect and the predicate predictor transitions back to state 410, decrementing the CV to 10. In addition, the processor must recover from the incorrect prediction, as explained above. If, however, the APV is equal to the PPV, the PPV is correct, and the predicate predictor remains in state 415. The embodiment of FIG. 4, in comparison to FIG. 2, tolerates occasional mispredictions while allowing predictions to continue.

Figure 5:
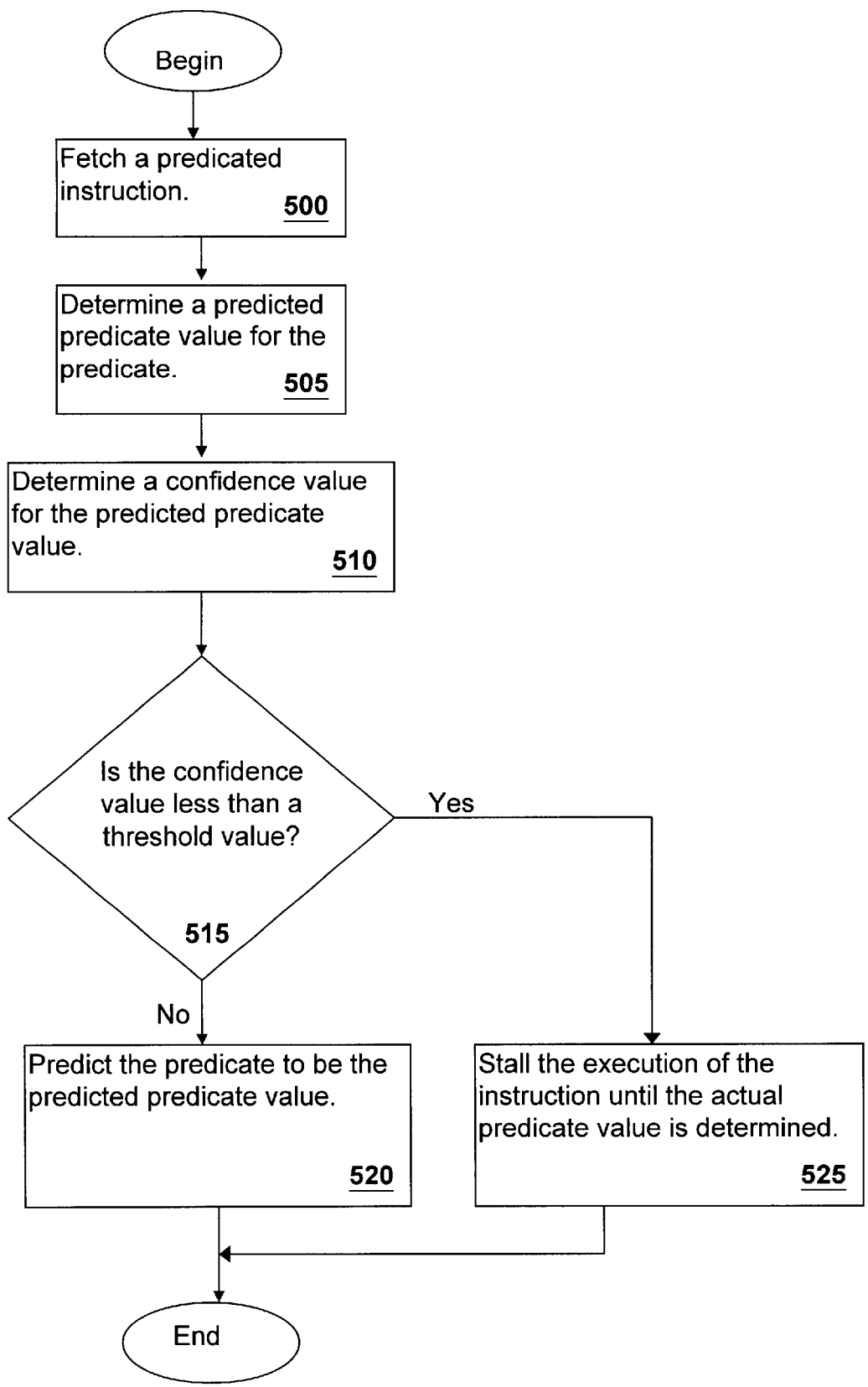
FIG. 5 is a flow chart showing a method of the present invention.

FIG. 5 is a flow chart showing a method of the present invention. At step 500 a predicated instruction is fetched. The instruction is predicated on a predicate. At step 505 a predicted predicate value is determined for the predicate. This predicted predicate value may be determined by reading a PPV entry from a predicate table in a position corresponding to the predicate, or by reading some other entry corresponding to the predicate and calculating the PPV therefrom. At step 510 a confidence value is determined for the predicted predicate value. This confidence value may be determined by reading a CV entry from a predicate table in a position corresponding to the predicate, or by reading some other entry corresponding to the predicate and calculating the CV therefrom. In accordance with one embodiment of the present invention, steps 505 and 510 are performed in parallel.

At step 515 of FIG. 5, it is determined if a confidence value is less than a particular threshold value. The threshold value may be predetermined by a processor designer and hardwired into the processor through the use of logic circuits coupled to a predicate table. Alternatively, the threshold value may be programmed by a user of the processor or may be dynamically adjusted by additional logic.

If the confidence value is less than the threshold value, the execution of the instruction is stalled at step 525 until the actual predicate value is determined. If, however, the confidence value is not less than the threshold value (i.e. it is greater than or equal to the threshold value), then the predicate is predicted to be the predicted predicate value at step 520.

Figure 6:
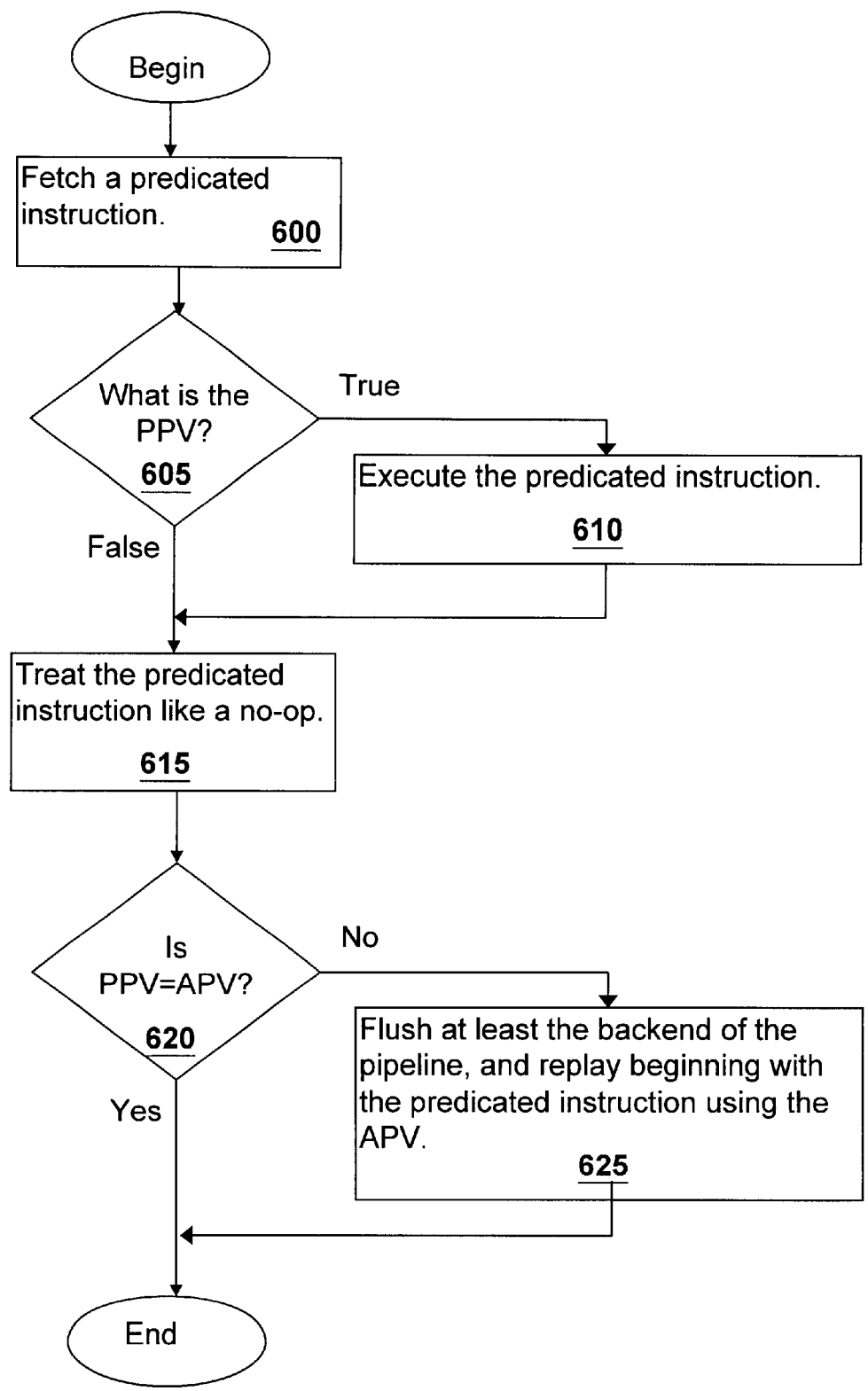
FIG. 6 is a flow chart showing an alternate method of the present invention.

FIG. 6 is a flow chart showing an alternate method of the present invention. At step 600 an instruction is fetched, the instruction being predicated on a predicate. At step 605, a PPV is determined for the predicate, accessed from a predicate table. This PPV may be determined by reading a PPV directly from a predicate table or by using historical information corresponding to the predicate and calculating the PPV therefrom. If the PPV is determined to be true, then the instruction is executed at step 610. If the PPV is determined to be false, then the instruction is treated like a no-op at step 615.

At step 620 of FIG. 6, it is determined if the PPV matches an APV. The APV is determined by executing a COMPARE instruction in parallel with the conditional execution of the predicated instruction. If the PPV is equal to the APV, then operation of the pipeline proceeds normally with the execution of subsequent instructions. If, however, the PPV is unequal to the APV, indicating a predicate misprediction, then the pipeline backend is flushed and replayed beginning with the predicated instruction using the APV as its predicate value.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:

a predicate table;

a predicate prediction calculator having an input coupled to an output of the predicate table;

a speculative predicate register file having an input coupled to an output of the calculator; and a pipeline having a predicted predicate value input coupled to an output of the file and an actual predicate value output coupled to an input of the predicate table.

2. The processor of claim 1, further comprising an XOR gate having a first input coupled to the actual predicate value output of the pipeline, a second input coupled to an output of the file, and an output coupled to a flush input of the pipeline.

3. A processor comprising:

a predicate table to store historical information corresponding to a predicate; and a pipeline coupled to the table, the pipeline to receive a predicted predicate value calculated from the historical information, and to conditionally execute a predicated instruction depending on the predicted predicate value, the pipeline including an actual predicate value output coupled to the predicate table to provide an actual predicate value to the predicate table.

4. The processor of claim 3, further comprising a predicate prediction calculator to calculate the predicted predicate value.

5. The processor of claim 3, further comprising a speculative predicate register file to store the predicted predicate value.

6. The processor of claim 3, wherein the pipeline includes a flush input to receive a flush signal if the predicted predicate value and the actual predicate value are unequal.

7. The processor of claim 3, wherein the predicate table is to further store historical information corresponding to a plurality of predicates.

* * * * *